P. S. PALMER.
HORSESHOE CALK.
APPLICATION FILED JULY 1, 1911.
1,022,867.
Patented Apr. 9, 1912.
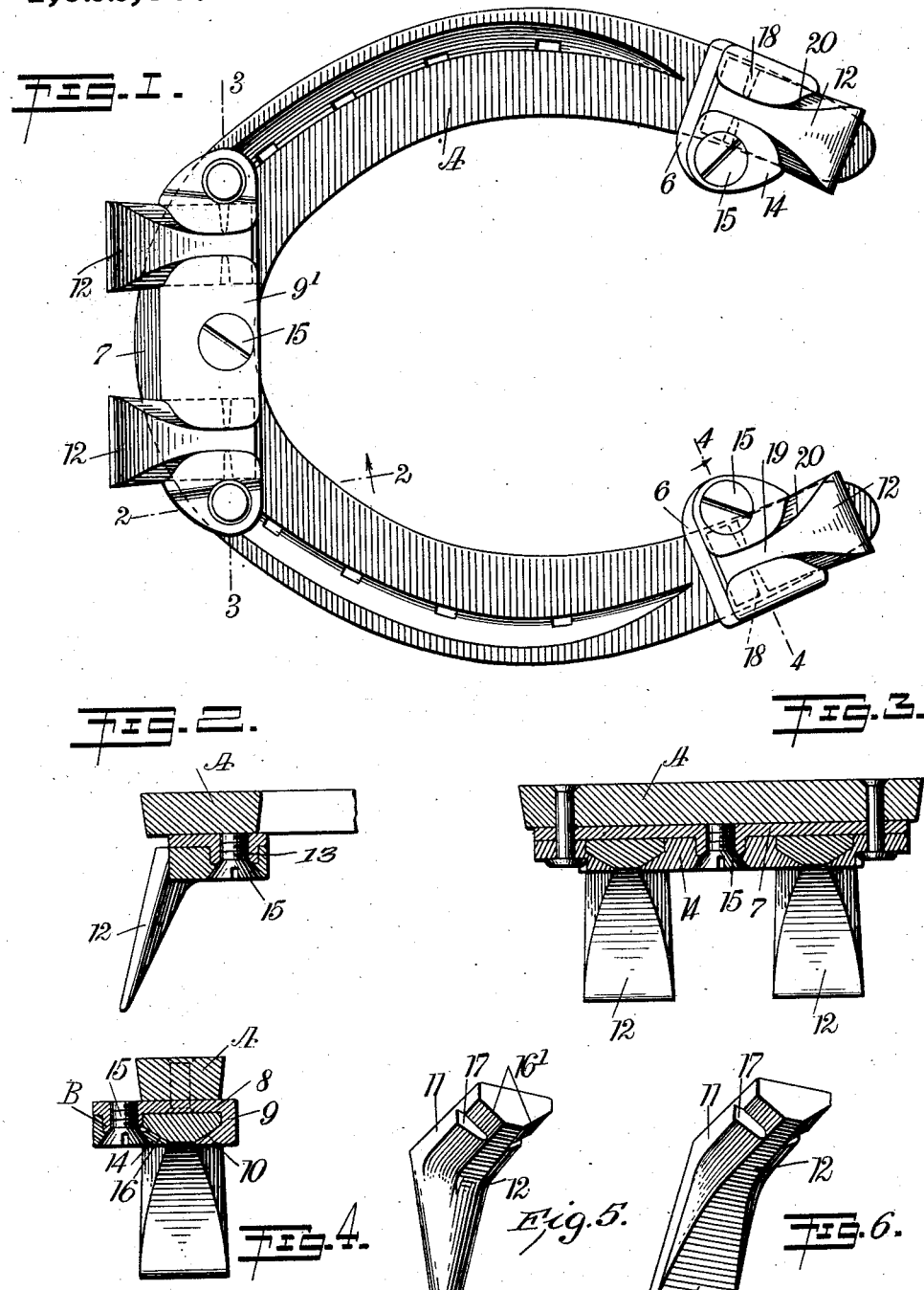
INVENTOR
Philip S. Palmer
BY
ATTORNEYS
WITNESSES

UNITED STATES PATENT OFFICE.

PHILIP S. PALMER, OF SPOKANE, WASHINGTON.

HORSESHOE-CALK.

1,022,867.　　　　　Specification of Letters Patent.　　Patented Apr. 9, 1912.

Application filed July 1, 1911. Serial No. 636,364.

*To all whom it may concern:*

Be it known that I, PHILIP S. PALMER, a citizen of the United States, and a resident of Spokane, in the county of Spokane and State of Washington, have invented a new and Improved Horseshoe-Calk, of which the following is a full, clear, and exact description.

My invention relates to an adjustable horseshoe calk and holder for the same.

An object of my invention is to use a one size shank for several different sizes of calks.

A further object of my invention is to provide an attachable or detachable horseshoe calk which may be of any desired slant or height, so that one size calk may be used with any desired size of shoe.

A still further object of my invention is to provide a calk so constructed as to avoid the necessity for tapping or threading the shoe.

I attain the above-outlined objects by fastening to the ends and crotch of a horseshoe, supporting plates having an overhanging edge on one side and an overhanging plate on the opposite side, between which overhanging edge and plate is removably disposed a calk of any of the forms now in use.

With the above and other objects in view, as will more fully hereinafter appear, the present invention consists in certain novel details of construction and arrangement of parts hereinafter fully described, illustrated in the accompanying drawings, and more particularly pointed out in the appended claims.

Reference is to be had to the accompanying drawings, forming a part of this specification, in which similar characters of reference indicate corresponding parts in all the figures, and in which—

Figure 1 is a plan view of the under side of a horseshoe showing a preferred embodiment of my invention attached thereto; Fig. 2 is a transverse sectional view taken on the line 2—2 of Fig. 1 and looking in the direction of the arrow; Fig. 3 is a transverse sectional view taken on the line 3—3 of Fig. 1; Fig. 4 is a transverse sectional view taken on the line 4—4 of Fig. 1 and looking in the direction of the arrow; Fig. 5 is a perspective view of a pointed end calk; and Fig. 6 is a view of a bladed-end calk.

In the several figures, I have shown a horseshoe A of the customary form, at each end of which is mounted a holder 6, and at the crotch of the shoe is mounted a double holder 7. The single holder comprises a substantially L-shaped bottom section 8, the end 9 of which is again turned inward to form an overhanging ledge 10, which overhanging ledge embraces one side of the shank 11 of a calk 12. The side of the bottom section 8 opposite the upturned end 9, is formed into a boss 13, disposed on which boss is a plate 14 fastened to the bottom section 8 by means of a broad headed screw 15. The plate 14 projects toward the overhanging ledge 10, and like the said ledge, is beveled on its under side as shown at 16. The under side of the shank 11 has converging beveled under sides 16' forming a snug fit with the ledge 10 and plate 14. The beveled sides of the shank 11 have transversely disposed grooves 17 in each face, which grooves engage with projections 18 on the adjacent portions of the bottom section and on the adjacent portion of the plate, to firmly hold the calks in position in the holder and prevent the same from sliding out of said holder.

To position a calk on the holder, the screw 15 is withdrawn thereby detaching the plate 14. The calk 12 is inserted so that the projection on the bottom section engages one of the grooves 17 in the calk, and then the plate 14 is inserted in close engagement with the shank 11 of the calk, the screw 15 inserted in position and the members screwed up tight.

When the bottom section and coacting plate are in position, there is formed between these two members, a narrow opening 19, which widens, as shown at 20, toward one side of the holder, thereby permitting the thickened portion of the calk to firmly fit within these two members. If desired, the plate at the crotch may be constructed so as to carry two calks transversely disposed, as shown in Fig. 1, in which case there are two overhanging ledges 10 extending in opposite directions from the centrally disposed plate 9', so that this double modification is but a duplication of the single device hereinbefore described in detail.

Having thus described my invention, I claim as new and desire to secure by Letters Patent:

1. In a horseshoe calk, in combination, a bottom section, one end of which is upturned and inturned to form an overhanging ledge, a boss on the end of the section opposite the upturned end and spaced apart therefrom, a plate removably fastened to said boss and projecting toward said ledge, said plate and ledge being each beveled on its adjacent under side, and a calk having a shank adapted to bear on said section between the ledge and plate, said shank being beveled to engage the beveled portions of the plate and overhanging ledge.

2. In a horseshoe calk, in combination, a bottom section, one end of which is upturned and inturned to form an overhanging ledge, a boss on the end of the section opposite the upturned end and spaced apart therefrom, a plate removably fastened to said boss and projecting toward said ledge, said plate and ledge being each beveled on its adjacent under side, and a calk having a shank adapted to bear on said section between the ledge and plate, said shank being beveled to engage the beveled portions of the plate and overhanging ledge, said shank having transversely disposed grooves therein, and said overhanging ledge and plate having transversely disposed projections extending therefrom adapted to engage said grooves, to prevent the calk from sliding out of said holder.

In testimony whereof I have signed my name to this specification in the presence of two subscribing witnesses.

PHILIP S. PALMER.

Witnesses:
BLANCHE M. KREIDER,
NEIL J. KOONTZ.

Copies of this patent may be obtained for five cents each, by addressing the "Commissioner of Patents, Washington, D. C."